(No Model.)

C. H. TRASK.
MECHANICAL MOVEMENT.

No. 252,339. Patented Jan. 17, 1882.

Witnesses:
H. G. Manning
W. R. Marble

Inventor:
Charles H. Trask,
By Sylvanus Walker
Attorney

UNITED STATES PATENT OFFICE.

CHARLES H. TRASK, OF LYNN, MASSACHUSETTS.

MECHANICAL MOVEMENT.

SPECIFICATION forming part of Letters Patent No. 252,339, dated January 17, 1882.

Application filed June 20, 1881. (No model.)

*To all whom it may concern:*

Be it known that I, CHARLES H. TRASK, of Lynn, in the county of Essex and State of Massachusetts, have invented a new and useful Improvement in Mechanical Movements, of which the following is specification.

The object of my invention is to provide a mechanical movement which shall be susceptible of transmitting power and motion past or through a single joint-connection without disturbing the free movement thereof in every direction from a straight line or fixed position, whereby either vertical or horizontal reciprocating motion, or vertical or horizontal rotary motion may be transmitted to an actuating tool or device susceptible of receiving a curvilinear movement in any, all, or every direction from a common center, or a partial rotation around a central point; and it consists, essentially, in the construction of a ball-and-socket joint having a belt-pulley journaled at or near the axial line of such joint, said belt-pulley being provided with an eccentric, spur, or lever gear, whereby the desired motion may be given to the actuating mechanism connecting said belt-pulley and the operating tool or device desired.

Figure 1:
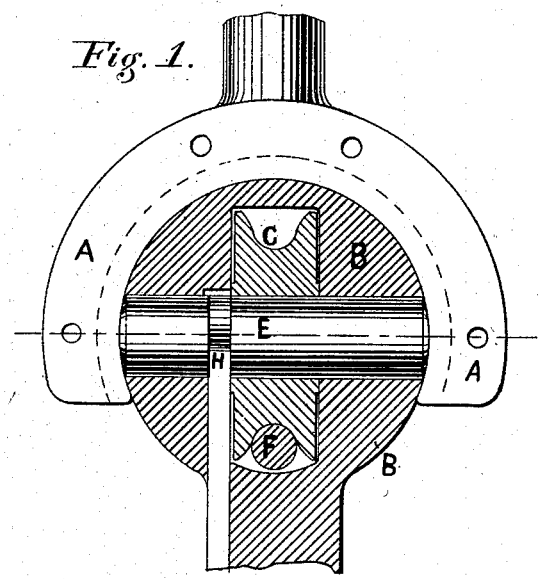
Figure 2:
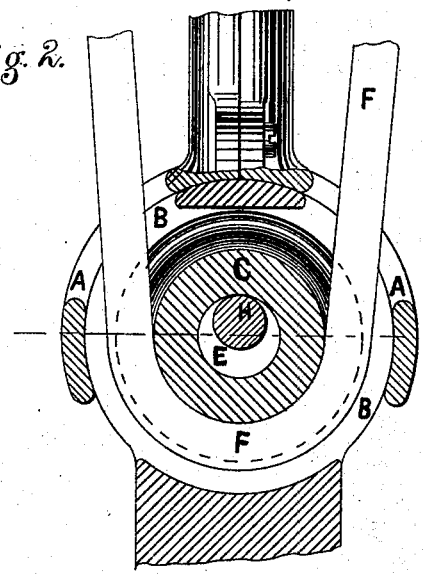
Figure 3:
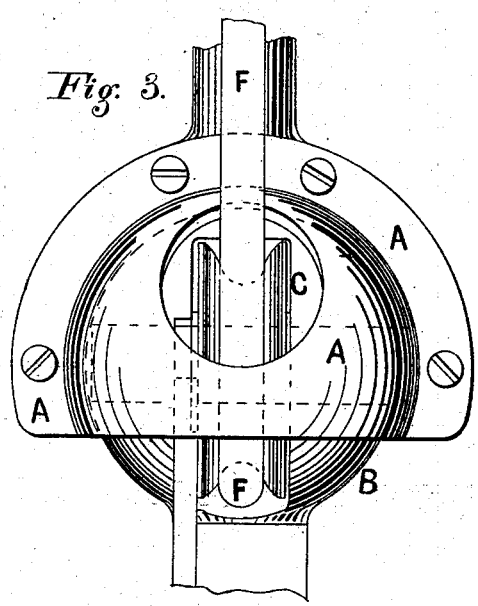

Figure 1 represents a sectional view of a ball-and-socket joint constructed according to my invention. Fig. 2 is a section view taken at a right angle to the former. Fig. 3 represents an elevation of the joint having a belt-pulley journaled therein.

A represents a skeleton-socket formed in two parts or halves and secured together with screw-bolts, so as to partially inclose the ball B, which is provided with an opening through the central portion, and into which is fitted a grooved belt-pulley, C, secured upon its journal E, which is provided with an eccentric, H, which may communicate a reciprocating motion to an actuating-bar suitably connected therewith, the journal E being fitted within a suitable hole formed through the said ball B, which serves as a journal-bearing therefor, a belt, F, passing through the openings formed in the socket A and around the pulley, C, whereby the desired power and motion may be communicated thereto and permit the said ball B to be freely moved within the said socket A in every direction, and not disturb the tension or movement of the said belt F.

This construction of ball and socket, having a belt-pulley journaled thereon, is more especially adapted to mechanism wherein it is desirable that the operating tool or device may be suspended or pendent from the ball portion of said joint, thus permitting free movement thereof in every direction from a point in line with the vertical plane of the axial line of said joint, whereby the driving-belt remains at the same tension throughout such movements.

Having thus described my invention, what I claim is—

1. A ball-and-socket joint having a belt-pulley journaled within the ball, at or near the axial line thereof, substantially as described, as and for the purposes set forth.

2. A ball-and-socket joint having a belt-pulley and eccentric journaled at or near the axial line thereof, substantially as described, as and for the purposes set forth.

3. A ball-and-socket joint having a belt-pulley journaled at or near the axial line thereof, and provided with a driving-belt adapted to pass through opening in said socket, substantially as described, and for the purposes set forth.

CHARLES HENRY TRASK.

Witnesses:
SYLVENUS WALKER,
W. R. MARBLE.